United States Patent
Schroeder et al.

(10) Patent No.: US 11,800,068 B1
(45) Date of Patent: Oct. 24, 2023

(54) REFRIGERATOR CAMERA MODULES AND METHODS FOR CONSERVING ENERGY AT THE SAME

(71) Applicant: Haier US Appliance Solutions, Inc., Wilmington, DE (US)

(72) Inventors: Michael Goodman Schroeder, Louisville, KY (US); Leonardo Maximiliano Falcon Izzi, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/715,254

(22) Filed: Apr. 7, 2022

(51) Int. Cl.
   *H04N 7/18* (2006.01)
   *F25D 29/00* (2006.01)
   *H04N 23/57* (2023.01)
   *H04N 23/65* (2023.01)

(52) U.S. Cl.
   CPC ........... *H04N 7/188* (2013.01); *F25D 29/005* (2013.01); *H04N 23/57* (2023.01); *H04N 23/651* (2023.01); *F25D 2700/02* (2013.01)

(58) Field of Classification Search
   CPC ...... H04N 7/188; H04N 23/57; H04N 23/651; F25D 29/005; F25D 2700/02
   See application file for complete search history.

(56) References Cited

U.S. PATENT DOCUMENTS

| | | | |
|---|---|---|---|
| 10,228,187 B2 | 3/2019 | Kim et al. | |
| 10,724,792 B2 | 7/2020 | Oh | |
| 10,970,983 B2 | 4/2021 | Johnson et al. | |
| 2015/0234364 A1* | 8/2015 | Gardner | H05B 6/6435 700/275 |
| 2017/0116987 A1* | 4/2017 | Kang | G10L 15/26 |
| 2019/0353421 A1* | 11/2019 | Junge | G01G 19/414 |
| 2020/0033051 A1* | 1/2020 | Wantland | F16H 1/20 |
| 2020/0033052 A1 | 1/2020 | Maeng | |
| 2020/0088463 A1 | 3/2020 | Jeong et al. | |
| 2020/0152312 A1* | 5/2020 | Connor | G06F 3/011 |
| 2020/0327601 A1* | 10/2020 | Kim | G06V 20/00 |
| 2021/0018261 A1* | 1/2021 | Choi | F25D 25/005 |
| 2021/0048242 A1* | 2/2021 | Kim | G06F 9/542 |
| 2021/0064143 A1* | 3/2021 | Stern | G06F 3/04886 |
| 2021/0397265 A1* | 12/2021 | Kosugi | G06F 1/325 |

* cited by examiner

*Primary Examiner* — Jared Walker
(74) *Attorney, Agent, or Firm* — Dority & Manning, P.A.

(57) ABSTRACT

A refrigerator appliance may include a cabinet, a door, a camera module, a user-detection assembly, and a controller. The cabinet may define a chilled chamber. The camera module may be mounted to the cabinet within the chilled chamber. The camera module may be alternately activated in a low-power sleep mode and a high-power awake mode. The user-detection assembly may be mounted to the cabinet to detect a user presence independent from rotation of the door. The controller may be operably coupled to the camera module and the user-detection assembly. The controller may be configured to initiate an operation routine that includes receiving one or more detection signals from the user-detection assembly, determining a user presence based on the received one or more detection signals, and directing the camera module to the high-power awake mode from the low-power sleep mode in response to determining the user presence.

18 Claims, 4 Drawing Sheets

REFRIGERATOR CAMERA MODULES AND METHODS FOR CONSERVING ENERGY AT THE SAME

FIELD OF THE INVENTION

The present subject matter relates generally to systems and methods for conserving the energy consumption of a camera, particularly for a camera in a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or spend money needlessly. Additionally or alternatively, some users may be unaware that certain items have been removed or consumed. Thus, users may fail to replace or replenish such items.

Existing systems have attempted to address these issues by providing a camera within the chilled chamber of the refrigerator appliance (e.g., to view or track the contents of the chilled chamber). Nonetheless, use of a camera within a chilled chamber creates additional issues. In particular, if a camera remains in fully-powered or awake mode wherein the entire circuit (e.g., every module) of the camera's image sensor is active to draw a current or voltage, the overall power consumption of the refrigerator appliance may rise significantly. This may increase the overall cost to operate the refrigerator appliance or may cause difficulties in reaching various regulatory requirements.

Many cameras or image sensors are configured to operate in relatively low-power or sleep modes wherein only a few (i.e., less than all) of the circuit's modules are active to draw a current or voltage. For instance, only the timing and communications modules (i.e., portions) of the camera or image sensor may be active in a low-power sleep mode. This obviously reduces the overall power consumption of the refrigerator, but generally renders the camera unable to capture any images. In turn, use of a low-power sleep mode may degrade the performance or responsiveness of the camera. In particular, it may take a notable amount of time (e.g., 1 to 5 seconds) to change to a high-power awake mode. During that time, the camera is generally unable to capture any images. Past approaches have attempted to wake a camera in conjunction with the opening of a refrigerator door. However, with the brevity and immediacy of many users' interactions with a refrigerator appliance, this may be unacceptable or undesirable if the camera is to capture images of items being inserted or removed.

As a result, it would be useful to provide a refrigerator appliance or method having one or more features for reducing power consumption (e.g., without degrading system performance or requiring significant time to wake when a user wishes to insert or remove an item from the refrigerator appliance).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a camera module, a user-detection assembly, and a controller. The cabinet may define a chilled chamber. The door may be rotatably hinged to the cabinet to provide selective access to the chilled chamber. The camera module may be mounted to the cabinet within the chilled chamber. The camera module may be alternately activated in a low-power sleep mode and a high-power awake mode. The user-detection assembly may be mounted to the cabinet to detect a user presence independent from rotation of the door. The controller may be operably coupled to the camera module and the user-detection assembly. The controller may be configured to initiate an operation routine that includes receiving one or more detection signals from the user-detection assembly, determining a user presence based on the received one or more detection signals, and directing the camera module to the high-power awake mode from the low-power sleep mode in response to determining the user presence.

In another exemplary aspect of the present disclosure, a method of operating a refrigerator appliance is provided. The method may include receiving one or more detection signals from a user-detection assembly. The method may further include determining a user presence based on the received one or more detection signals. The method may still further include directing the camera module to a high-power awake mode from the low-power sleep mode in response to determining the user presence.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
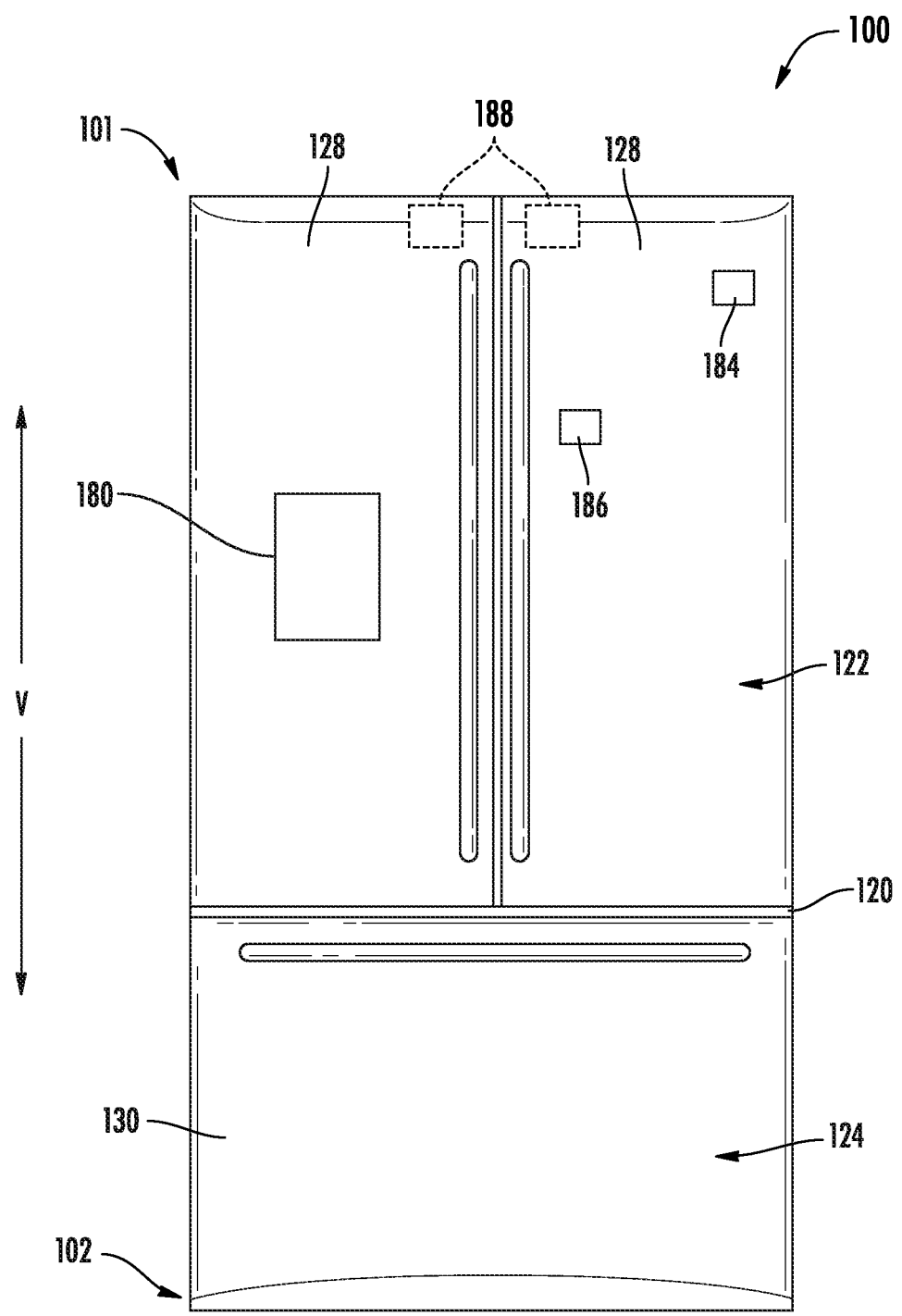
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Generally, the present disclosure provides systems and methods to change or alternate the mode of a camera assembly apart from movement of a refrigerator door. For instance, one or more sensors may detect the presence of a user near a refrigerator appliance. Based on the user's presence, the camera may automatically (e.g., without direct user input) be placed in a mode or state of operation wherein it can quickly capture images in a chilled chamber.

Figure 2:
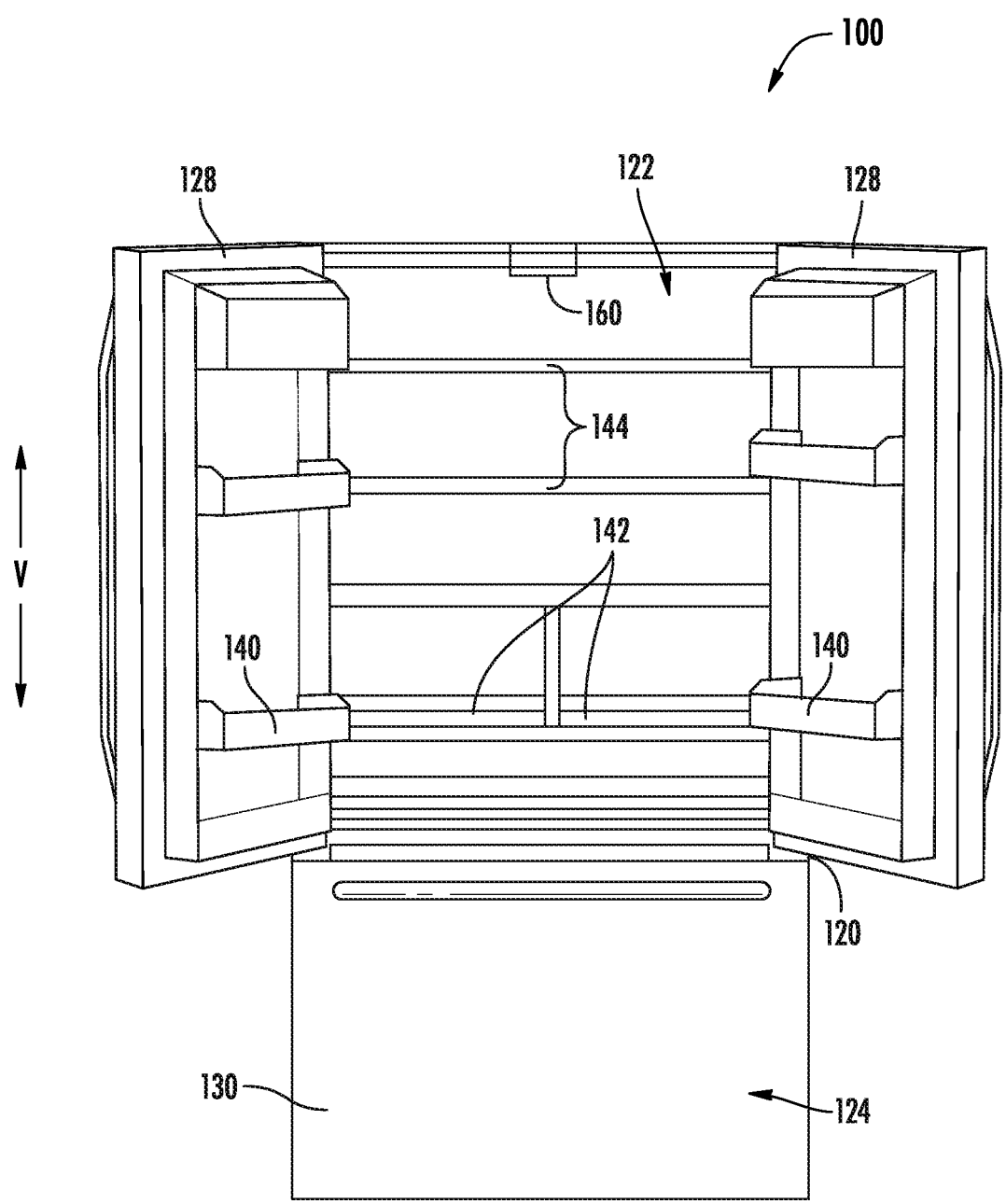
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
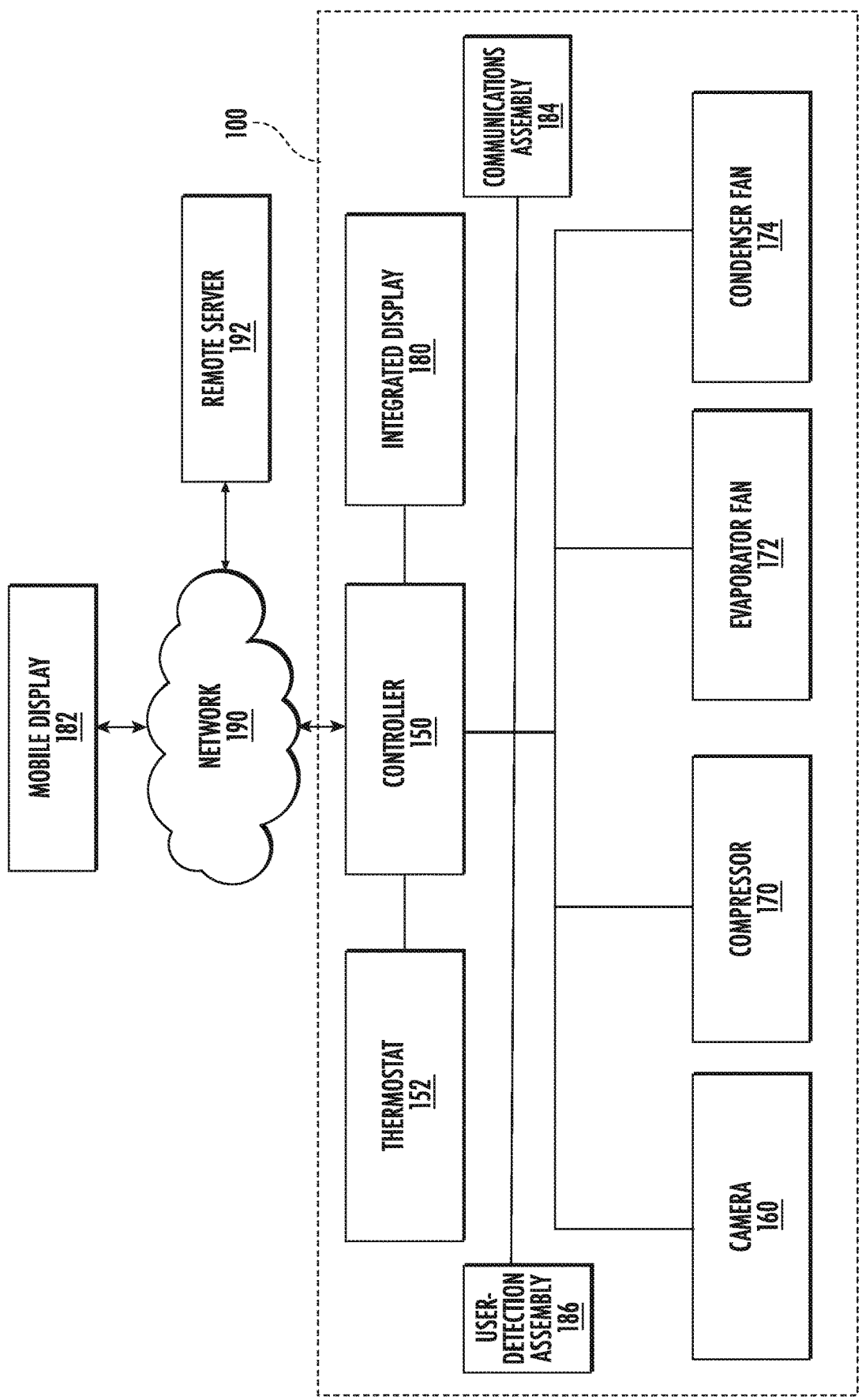
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 400 described below with reference to FIG. 4). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electric communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or camera module 160. Camera 160 may be any type of device suitable for capturing a two-dimensional picture or image. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned on refrigerator appliance 100. In some embodiments, camera 160 is mounted within fresh food chamber 122 at a top portion thereof (e.g., adjacent top 101). For instance, camera 160 may be fixed to or directed through a top wall of an internal liner defining fresh food chamber 122. In such embodiments, camera 160 may be directed downward, as illustrated in FIG. 2.

In certain embodiments, is directed toward one or more chilled chamber (e.g., fresh food chamber 122—FIG. 2). For instance, camera 160 may be directed towards at least a portion of any particular one of or combination of drawers 142 and shelves 144 (FIG. 2). Thus, camera 160 can capture images of one of drawers 142, all of drawers 142, one of shelves 144, all of shelves 144, or any suitable combination thereof.

Although camera 160 is illustrated as being mounted within fresh food chamber 122, it is understood that additional or alternative embodiments include a camera assembly [e.g., digital camera with an electronic image sensor, such as a charge coupled device (CCD) or a CMOS sensor] mounted at another suitable portion of refrigerator appliance, such as a door 128. Such a camera assembly may be directed outward or in front of refrigerator appliance 100 and may thus capture images of a user or area positioned forward from refrigerator appliance 100 (e.g., when the corresponding door is in a closed position).

Generally, camera 160 is able to capture images or otherwise execute an image capture sequence in a high-power awake mode. In the high-power awake mode, most (e.g., all) of the image sensor—or the electronic circuit thereof—for camera 160 may be active to a draw a current or voltage. Separately or additionally, camera 160 may be provided with (e.g., able to enter or be maintained in) a low-power sleep mode. In the low-power sleep mode, relatively little (e.g., less than all) of the image sensor—or the electronic circuit thereof—for camera 160 may be active to draw a current or voltage (e.g., in comparison to the high-power awake mode). In turn, the power draw of the camera 160 in the low-power sleep mode may be less than the power draw in the high-power awake mode. Optionally, only the timing and communications modules (i.e., portions) of the camera sensor may be active. Thus, camera 160 may be unable to or restricted from capturing images or otherwise executing an image capture sequence in the low-power sleep mode. Although, camera 160 may be able to switch, alternate, or otherwise change modes from the low-power sleep mode to the high-power awake mode, such changes may take time (e.g., more than 1 second, such as between 1 second and 5 seconds) before the camera 160 is able to start capturing images or initiate the image capture sequence.

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

Separate from or in addition to integrated display 180, refrigerator 100 may include a communications assembly 184 in communication with controller 150. Generally, communications assembly 184 may be mounted on any suitable portion of refrigerator 100, such as within cabinet 120 or a door 128. In certain embodiments, the communications assembly includes a loudspeaker (e.g., dynamic loudspeaker, electrostatic loudspeaker, planar magnetic loudspeaker, piezoelectric loudspeaker etc.). As is understood, the loudspeaker may be configured to generate soundwaves from one or more electrical signals (e.g., digital sound signals received from controller 150). The loudspeaker may thus audibly communicate information to a user. In additional or alternative embodiments, the communications assembly includes a microphone (e.g., dynamic microphone, ribbon microphone, fiber-optic microphone, piezoelectric microphone, etc.). As is understood, the microphone may generate one or more electrical signals (e.g., to be received by controller 150) from one or more received soundwaves (e.g., from a user). The microphone may thus receive audible prompts or commands from a user that can be directed to the controller 150.

In exemplary embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a user device or mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

In some embodiments, refrigerator appliance 100 includes a user-detection assembly 186 that is mounted to cabinet 120 (e.g., directly or, alternatively, indirectly, such as via a door 128). Generally, user-detection assembly 186 includes one or more sensors configured to detect the presence of a user (e.g., independently or apart from rotation of any door 128 or 130). As an example, user-detection assembly 186 may include a wireless module configured to wirelessly connect with a user device and receive a wireless connection signal (e.g., Wi-Fi, Bluetooth, or other appropriate communications medium) from a user device or mobile display 182 in close proximity to the appliance 100, as would be understood.

As another example, user-detection assembly 186 may include a body sensor module, which is configured to detect the physical body (or direct characteristics thereof) of a user. Such a body sensor module may include a light transducer, such as, but not limited to, an infrared light sensor, a visible light sensor, or a camera, which is configured to receive a light emission detected or reflected from a user's body, as would be understood. Additionally or alternatively, the body sensor module may include an ultrasonic transducer configured to transmit one or more high frequency sound waves, and to receive one or more reflected high frequency sound waves. The sound waves received by the sensor may have associated time intervals corresponding to an amount of time between the transmission of the sound wave and reception of the corresponding reflected sound wave. The presence of a user may be detected at least in part on a comparison between the time interval of a received sound wave and a baseline time interval associated with a baseline signal. Further additionally or alternatively, the body sensor module may include a touch sensor, such as an imaging sensor, capacitive sensor, or resistive sensor (e.g., mounted on door 128), which is configured to emit one or more corresponding signals in response to touch or contact of a user on a predefined touch zone of the touch sensor, as would be understood.

Optionally, user-detection assembly 186 is configured to detect a biometric or personalized marker corresponding to a specific individual user and, thus, may not only detect the presence of a user, but also identify a specific user (e.g., from a collection of multiple discrete user's). As an example, user-detection assembly 186 may include a forward-facing camera configured to recognize or identify a user's face based on a captured two-dimensional image. As another example, user-detection assembly 186 may include a fingerprint imaging sensor configured to visually detect a user's fingerprint. As yet another example, user-detection assembly 186 may include a wireless module configured to detect a device address (e.g., of a user device) over a wireless communications band (e.g., a BLE band using short-wavelength UHF radio waves in the ISM band from 2.4 to 2.485 GHz). The device address may be a programmed Bluetooth address of, for instance, a remote user device or mobile display 182. The user-detection assembly 186 may thus determine if and when a mobile display 182 is within close proximity to refrigerator appliance 100.

In certain embodiments, an secondary camera assembly is included as part of user-detection assembly 186. As an example, a secondary camera assembly (e.g., mounted to a door 128) user-detection assembly 186 may be directed outward (e.g., away from cabinet 120 or chilled chamber 122) and may be configured to recognize or identify a user from a two-dimensional image captured at the secondary camera assembly. In some such embodiments, controller 150 is further configured to recognize one or more defining features, such as a user's face, skin tone, arm/hand size, jewelry, typical clothing, etc. As is understood, recognizing such defining features may be performed by edge matching, divide-and-conquer search, greyscale matching, histograms of receptive field responses, or another suitable routine (e.g., executed at the controller 150 based on one or more captured images from the secondary camera assembly).

During use, such as during an image capture sequence for the camera 160, camera 160 may capture one or more two-dimensional images (e.g., as a video feed or series of sequential static images) that may be transmitted to the controller 150 (e.g., as a data signal), as is generally understood. Optionally, the image capture sequence may be initiated by a predetermined user action, such as opening a door 128, detected movement within a chilled chamber (e.g., fresh food chamber 122), engaging or moving within range of user-detection assembly 186, proving a user input at communications assembly 184 or integrated display 180, etc.

Separate or independent from the user-detection assembly 186, refrigerator appliance 100 may include one or more door switches 188 (e.g., reed switch, pusher switch, Hall effect sensor, etc.) selectively engaged with a refrigerator door 128 to detect if/when the door 128 is in an open position. Such switches are generally understood and may, for instance, simultaneously control activation of a light for illuminating the fresh food chamber 122. Opening the refrigerator door 128 may thus activate the light and transmit an open signal indicating door 128 is in the open position (e.g., not closed).

In some embodiments, one or more remote servers 192, such as a web server, is in operable communication with controller 150. The remote server 192 can be used to host a retailer's point of sale system. In other words, remote server 192 may be or include a retailer point of sale server that tracks, for example, an identifier and quantity of purchased items, a time or date stamp of purchased items, pricing of purchased items, a customer identifier (i.e., an identifier of the purchasing customer), etc. Additionally or alternatively, the remote server 192 can be used to host a retailer's stock management system. In other words, remote server 192 may include, or be provided as, a retailer stock management server that tracks, for example, stocking data relating to items offered for sale by a retailer (e.g., expiration data, location data, cost data, etc.). Also additionally or alternatively, the remote server 192 can be used to host one or more information databases.

The remote server 192 can be implemented using any suitable computing device(s). The remote server 192 may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions which are executed by the processor to cause remote server 192 to perform operations. For example, instructions could be instructions for receiving/transmitting point of sale data signals, receiving/transmitting inventory management data signals, receiving/transmitting data signals relating to a stored item, etc.

The memory devices may also include data, such as point of sale data, customer identification data, inventory data, expiration data, etc., that can be retrieved, manipulated, created, or stored by processor. The data can be stored in one or more databases. The one or more databases can be connected to remote server 192 by a high bandwidth LAN or WAN, or can also be connected to remote server 192 through network 502. The one or more databases can be split up so that they are located in multiple locales.

Remote server 192 includes a network interface such that remote server 192 can connect to and communicate over one or more networks (e.g., network 190) with one or more network nodes. In turn, remote server 192 can exchange data with one or more nodes over the network 190. In particular, remote server 192 can exchange data with controller 150. Although not pictured, it is understood that remote server 192 may further exchange data with any number of client devices over the network 190 (e.g., mobile display 182).

In certain embodiments, camera 160 and controller 150 are configured to capture multiple, sequential, two-dimensional images (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. Optionally, the image capture sequence may subsequently be stopped or halted according to one or more end conditions, such as expiration of a predetermined time period, failure to detect further changes in sequential images, or closing of the door 128.

From the captured images, controller 150 may automatically attempt to recognize items (e.g., stored items, such as food, or non-stored items such as a user appendage, a shelf, a movable drawer, etc.) within the field of view for the camera 160. As is understood, recognizing such items, may be performed by edge matching, divide-and-conquer search, greyscale matching, histograms of receptive field responses, or another suitable routine (e.g., executed at the controller 150 based on one or more captured images from camera 160). The recognition may include or attempt to estimate the identification (e.g., what type of food or object is recognized) or quantity (e.g., number of discrete units, volume, or mass) of the stored item. Optionally, a recognition score may be assigned to each recognized stored item. Generally, the recognition score provides a probability or likelihood that the recognition or estimate is correct. Based on additional data or confirmation (e.g., received from one or more remote servers 192), the recognition score may be updated or refined.

Figure 4:
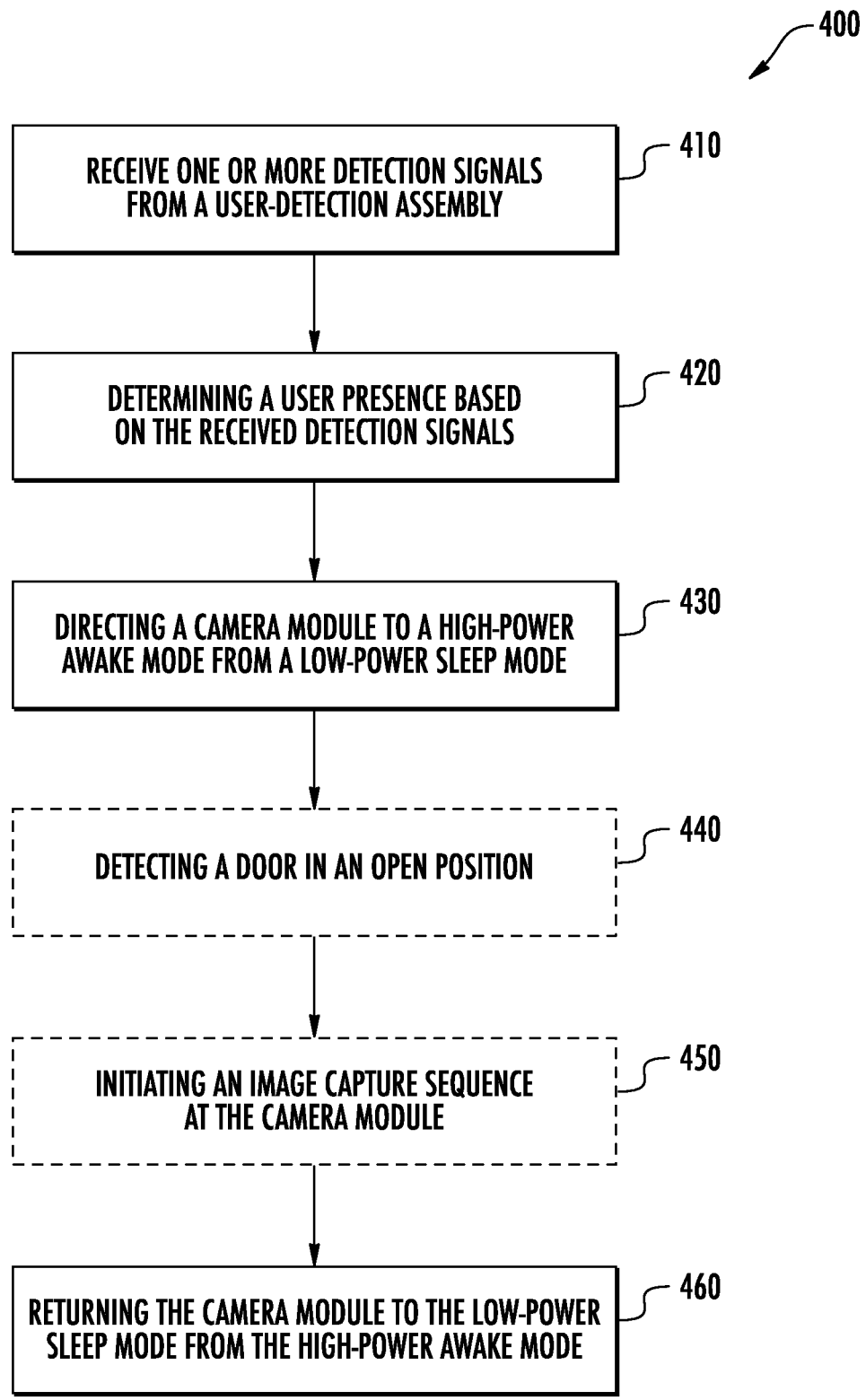
FIG. 4 provides a flow chart illustrating a method of operating a refrigerator appliance according to exemplary embodiments of the present disclosure.

Turning now to FIG. 4, a flow chart is provided of a method 400 according to exemplary embodiments of the present disclosure. Generally, FIG. 4 provides a method of operating a refrigerator appliance 100 (FIG. 1) that includes a camera 160, as described above. The method 400 can be performed, for instance, by the controller 150 (FIG. 3). For example, controller 150 may, as discussed, be in communication with camera 160, integrated display 180 (FIG. 3), mobile display 182 (FIG. 3), communications assembly 184, user-detection assembly 186, or remote server(s) 192. During operations, controller 150 may send signals to and receive signals from camera 160, integrated display 180, mobile display 182, communications assembly 184, user-detection assembly 186, or remote server(s) 192. Controller 150 may further be operatively coupled to other suitable components of the appliance 100 to facilitate operation of the appliance 100 generally.

Advantageously, methods in accordance with the present disclosure may limit or reduce power consumption (e.g., without degrading system performance or requiring significant time to begin capturing images when a user wishes to insert or remove an item from the refrigerator appliance).

FIG. 4 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure (except as otherwise described).

At 410, the method 400 includes receiving one or more detection signals from the user-detection assembly. As described above, the user-detection assembly might include one or more modules to detect a user's presence (e.g., based on user device/mobile display or a user's physical presence). As a result, 410 may include receiving a wireless connection signal from the user device. Such wireless connection signals may correspond to, for instance, Wi-Fi, Bluetooth, or some other appropriate communications medium. Additionally or alternatively, 410 may include receiving a presence signal corresponding to a physical body from the body sensor module.

As described above, the user-detection assembly may be configured to detect a biometric or personalized marker corresponding to a specific individual user. For instance, the marker may be the specific user's face, fingerprint, arm, device address, etc. While the user-detection assembly is active, data therefrom may be transmitted to, for instance, the controller of the refrigerator appliance as a detection signal.

At 420, the method 400 includes determining a user presence based on the received one or more detection signals. For instance, the presence of a user may be determined by nature of (e.g., in response to) receiving the detection signal(s). The presence detection (or attempts thereof) may be repeated continuously or at a predetermined interval (e.g., to ensure a user remains present). Optionally, 420 may include detecting the specific user based on the marker signal. In other words, the signal received from the user-detection assembly may be determined to correspond to the specific user. As described above, the detection of the specific user may include object recognition, identifying a device address, or any other suitable determination that a particular marker corresponding to the specific user is received at 410. The detection at 420 may thus indicate the specific user has engaged the user-detection assembly.

At 430, the method 400 includes directing the camera module to the high-power awake mode from the low-power sleep mode. For instance, 430 may be in response to determining the user presence at 420. Thus, 420 may generally prompt the camera module to change from a mode of limited power draw in which images cannot be capture to another mode of greater power draw in which images can be captured. In other words, additional portions of the image sensor of the camera module may be activated or otherwise be permitted to draw a voltage or current at 430.

At 440, the method 400 includes optionally detecting the door in an open position following or subsequent to 430. Specifically, the door may be detected as being in the open position while the camera module remains in the high-power awake mode. In some embodiments, 440 includes receiving an open signal from the door switch.

In additional or alternative embodiments, 440 includes detecting an elevated image value in the received static image signal. The elevated image value may be of a brightness or color value of a pixel or set of pixels in a static image of a closed-door image capture sequence. The elevated image value may an image value that is determined to exceed a baseline image value or value set. Optionally, the closed-door capture sequence may be prompted by or initiated in response to 430. Thus, after the camera module is directed to the camera module may start (e.g., immediately)

capturing images of the chilled chamber. As described above, images captured at the camera may be transmitted to (and received by) the controller of refrigerator appliance (e.g., as such images are captured). The static image signal may thus correspond to an image captured at the camera module as part of the closed-door image capture sequence.

The closed-door capture sequence may capture images of the chilled chamber when little or no information is expected to be discernable (e.g., empty images prior to 440). Thus, such images (as provided with an image signal) may be deleted or discarded from the controller. Optionally, the static image signal may be discarded immediately upon receipt at the controller. Alternatively, the static image signal may be discarded following (e.g., in response to) an ephemeral evaluation, such as to detect an elevated pixel value or compare a pair of sequential image signals.

At 450, the method 400 includes optionally initiating (e.g., starting or continuing) an image capture sequence at the camera module. Such an image capture sequence may follow the door being in the open position and thus be an open-door image capture sequence. In some embodiments, 440 is in prompted by or in response to 440. Thus, one or more images may be captured in response to detected that the door has been opened or otherwise moved away from a closed position.

In certain embodiments, 450 includes receiving an occupied image signal from the camera module during an open-door capture sequence. In certain embodiments, the refrigerator appliance can alternate between at least two capture sequences. Thus, the method 600 may include alternating from the continuous anti-fog capture sequence to the open-door capture sequence at the camera module. During the open-door capture sequence, images captured at the camera module may be transmitted to (and received by) the controller of refrigerator appliance (e.g., as such images are captured). The occupied image signal at 450 may thus correspond to an image captured at the camera module as part of the open-door capture sequence.

Generally, the open-door capture sequence may direct images to be captured sequentially at the camera module. The sample rate of the open-door capture sequence between 25 frames per second and 120 frames per second. Additionally or alternatively, the sample rate may be greater than or equal to 30 frames per second. Further additionally or alternatively, the sample rate may be around 60 frames per second.

At 460, the method 400 includes returning the camera module to the low-power sleep mode from the high-power awake mode. For instance, 460 may be prompted by or in response to determining the door is moved to a closed position (e.g., based on a closed signal received from the door switch or detection of an empty image following 440 or 450). Additionally or alternatively, 460 may be prompted by or in response to one or more absence signals from the user-detection assembly following 430, 440, or 450. Such absence signals may generally be understood as signals received from the user-detection assembly that correspond to or indicate a user is no longer present or proximal to the refrigerator appliance, as would be understood in light of the present disclosure. Further additionally or alternatively, 460 may be prompted by or in response to expiration of a preset timer, which may be initiated or started, for instance, in response to 430, 440, 450, or another suitable triggering event.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber;
   a camera module mounted to the cabinet within the chilled chamber, the camera module being alternately activated in a low-power sleep mode and a high-power awake mode;
   a user-detection assembly mounted to the cabinet to detect a user presence independent from rotation of the door; and
   a controller operably coupled to the camera module and the user-detection assembly, the controller being configured to initiate an operation routine comprising
      receiving one or more detection signals from the user-detection assembly,
      determining a user presence based on the received one or more detection signals, and
      directing the camera module to the high-power awake mode from the low-power sleep mode in response to determining the user presence.

2. The refrigerator appliance of claim 1, the operation routine further comprising
   detecting the door in an open position subsequent to the directing the camera module to the high-power awake mode, and
   initiating an image capture sequence at the camera module in response to detecting the door in the open position.

3. The refrigerator appliance of claim 2, further comprising a door switch in selective communication with the door, wherein detecting the door in the open position comprises receiving an open signal from the door switch.

4. The refrigerator appliance of claim 2, the operation routine further comprising receiving a static image signal from the camera module during the image capture sequence, wherein detecting the door in the open position comprises detecting an elevated image value in the received static image signal.

5. The refrigerator appliance of claim 1, the operation routine further comprising initiating an image capture sequence at the camera module in response to directing the camera module to the high-power awake mode.

6. The refrigerator appliance of claim 5, the operation routine further comprising
   receiving a static image signal from the camera module during the image capture sequence, and
   discarding the received static image signal.

7. The refrigerator appliance of claim 1, wherein the user-detection assembly comprises a wireless module to wirelessly connect with a user device, and wherein receiving one or more detection signals comprises receiving a wireless connection signal from the user device.

8. The refrigerator appliance of claim 1, wherein the user-detection assembly comprises a body sensor module to detect a physical presence forward from the cabinet, and wherein receiving one or more detection signals comprises receiving a presence signal corresponding to a physical body from the body sensor module.

9. The refrigerator appliance of claim 1, wherein the camera module is mounted within a cabinet at a top portion of a chilled chamber.

10. A method of operating a refrigerator appliance comprising a cabinet, a user-detection assembly mounted to the cabinet, and a camera module mounted to the cabinet within a chilled chamber, the method comprising:
   receiving one or more detection signals from the user-detection assembly;
   determining a user presence based on the received one or more detection signals; and
   directing the camera module to a high-power awake mode from the low-power sleep mode in response to determining the user presence.

11. The method of claim 10, wherein the refrigerator appliance further comprises door mounted to the cabinet, the method further comprising:
   detecting the door in an open position subsequent to the directing the camera module to the high-power awake mode; and
   initiating an image capture sequence at the camera module in response to detecting the door in the open position.

12. The method of claim 11, wherein the refrigerator appliance further comprises a door switch in selective communication with the door,
   wherein detecting the door in the open position comprises receiving an open signal from the door switch.

13. The method of claim 11, the method further comprising:
   receiving a static image signal from the camera module during the image capture sequence, wherein detecting the door in the open position comprises detecting an elevated image value in the received static image signal.

14. The method of claim 10, further comprising:
   initiating an image capture sequence at the camera module in response to directing the camera module to the high-power awake mode.

15. The method of claim 10, further comprising:
   receiving a static image signal from the camera module during the image capture sequence, and
   discarding the received static image signal.

16. The method of claim 10, wherein the user-detection assembly comprises a wireless module to wirelessly connect with a user device, and wherein receiving one or more detection signals comprises receiving a wireless connection signal from the user device.

17. The method of claim 10, wherein the user-detection assembly comprises a body sensor module to detect a physical presence forward from the cabinet, and wherein receiving one or more detection signals comprises receiving a presence signal corresponding to a physical body from the body sensor module.

18. The method of claim 10, wherein the camera module is mounted within a cabinet at a top portion of a chilled chamber.

* * * * *